Figure 1:
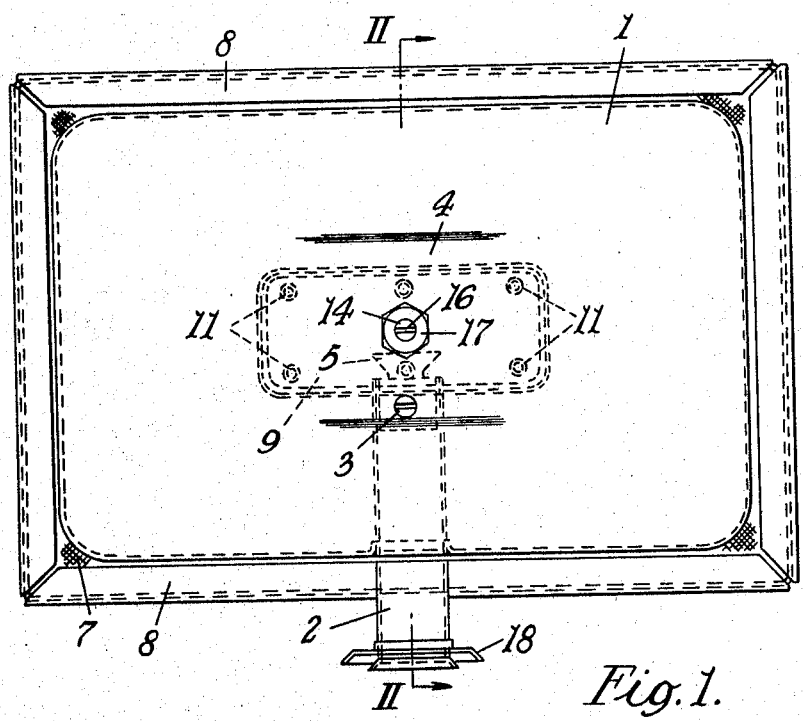

Jan. 17, 1967  W. A. NICHOLSON  3,298,419
RADIATING OR INCANDESCENT BURNER
Filed March 30, 1964  2 Sheets-Sheet 1

United States Patent Office 3,298,419
Patented Jan. 17, 1967

3,298,419
RADIATING OR INCANDESCENT BURNER
William Arthur Nicholson, London, England, assignor to Radiation Limited, London, England, a British company
Filed Mar. 30, 1964, Ser. No. 355,695
5 Claims. (Cl. 158—99)

This invention relates to radiating or incandescent burners of the kind embodying a distribution chamber for combustible gas received from a mixing tube or space, an outlet from this distribution chamber being covered by a refractory diaphragm comprising a layer of gas-pervious gauze or two or more such layers in mutual intimate contact over their whole effective area. Examples of such burners are described in British patent specification No. 798,076.

It is an object of this invention to provide a radiating or incandescent burner of the kind referred to having means for producing a substantially uniform heating effect over a receiving area spaced apart from the diaphragm and lying parallel thereto.

It is a further object of this invention to prevent any partial burning of combustible gas in, and hence to prevent the emission of products of incomplete combustion and objectionable smells from, a radiating or incandescent burner of the kind referred to, the burner having means for producing a substantially uniform heating effect over a receiving area spaced apart from the diaphragm and lying parallel thereto.

Further objects will become apparent as the description proceeds.

The present invention consists in a radiating or incandescent burner of the kind referred to wherein a screen is provided in proximity to a central portion of the refractory diaphragm to prevent or restrict the passage of gas through the said central portion so as to produce a substantially uniform heating effect over a receiving area spaced apart from the diaphragm.

The area of the screen is preferably approximately one tenth of the total area of the outlet, for instance, from one eighth to one twelfth of this total area.

If desired, the screen can be provided in proximity only to the central portion of the refractory diaphragm; such an arrangement compares favourably with an arrangement where a screen having suitably disposed holes of the correct dimension is disposed to coincide with the whole area of the refractory diaphragm.

It is more convenient to arrange the screen on the inside of the diaphragm, but in some instances it has been found that the screen can move slightly away from the diaphragm, sufficient to allow combustible mixture to creep between the screen and the diaphragm. If this creeping occurs, the combustible mixture may be only partly burnt between the screen and the diaphragm, with the result that products of incomplete combustion escape and objectionable smells are produced, particularly if the organic sulphur content of the combustible gas is high, when a mixture of sulphur oxides and aldehydes of a somewhat pungent nature may be emitted. In order to prevent this creeping, it is highly desirable that an inner screen be provided on the inside of the diaphragm and an outer screen be provided on the outside of the diaphragm, opposite the inner screen.

The two screens may be fixed in position by attaching one to the other through the diaphragm, e.g. by riveting, bolting or screwing. In some cases they may be attached by welding. It is highly desirable that the outer screen be not smaller than the area of the inner screen in contact with the diaphragm (or if this inner screen contacts the diaphragm by way of a continuous flange or other projection, than the area delineated by this flange or projection). If the diaphragm is formed, as is preferred, by a double layer of gauze, the central portions of the two layers can be held firmly together by the two screens.

The diaphragm will normally be attached to the burner around its edge portions; in order to tension the diaphragm, an adjustable tensioning means can be provided to bias the said inner screen outwardly against the diaphragm. This tensioning means can be provided in a simple manner by a screwed member passing through a casing of the distribution chamber and abutting said screen; the screwed member can be locked in position for instance by a lock-nut and a gland can be arranged to give a gas-tight seal between the screwed member and the casing. Other arrangements may be used to tension the diaphragm, for instance using set screws to draw out the periphery of the diaphragm, but using the tensioning means above, the periphery of the diaphragm may be fixed rigidly to the burner casing, preferably, by being merely clamped in position between a clamping frame and the edge portions of the casing.

Figure 2:
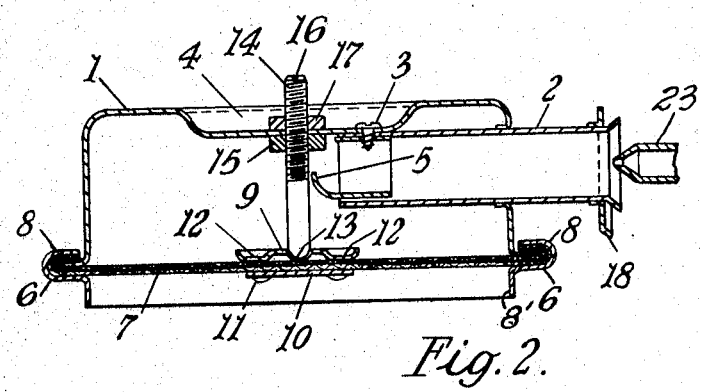
Figure 3:
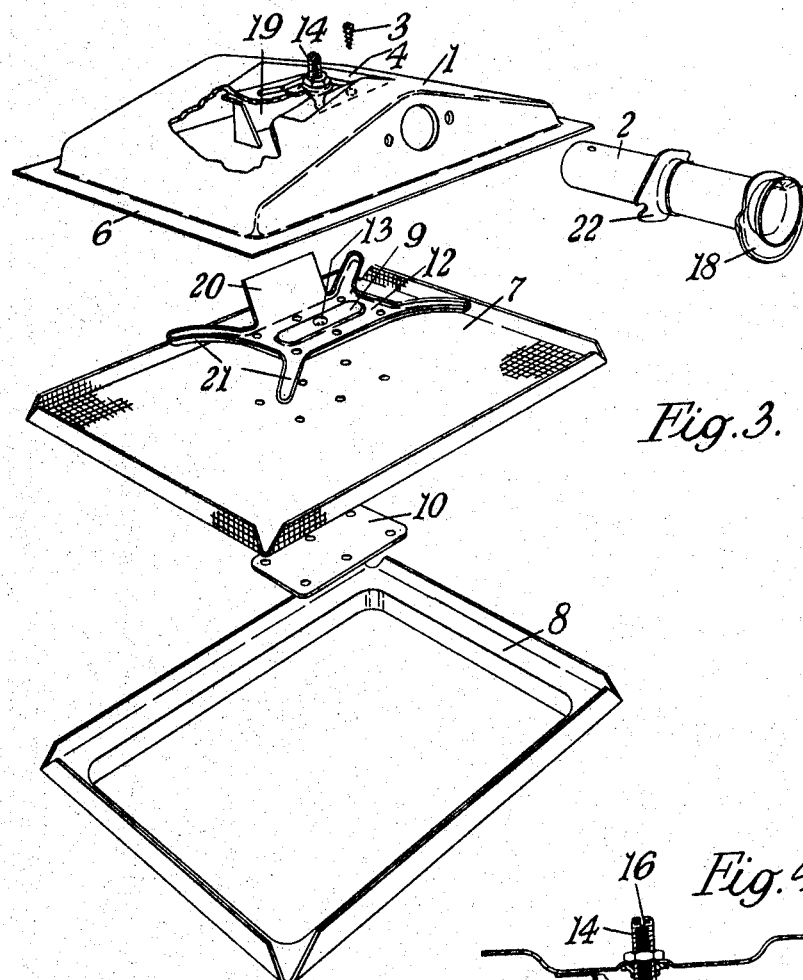
Figure 4:
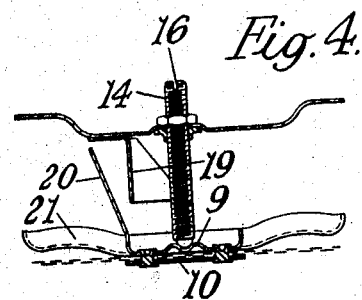

The invention will be further described by way of example, with reference to the accompanying drawings, of which:

FIGURE 1 is a top view of one embodiment of a burner in accordance with the invention;
FIGURE 2 is a cross-section along the line II—II of FIGURE 1;
FIGURE 3 is an exploded view of a second embodiment of the invention; and
FIGURE 4 is a cross section on an enlarged scale of a detail of the embodiment shown in FIGURE 3.

The burner shown in FIGURES 1 and 2 has a hood 1 through one side (usually a longer side) of which passes a burner mixing tube 2; the mixing tube 2 is sealed to the hood 1 at its point of entry and is secured in position by a self-tapping screw 3 which is located in a depression 4 in the top of the hood 1. This screw 3 also secures an inlet tube baffle 5 to the inner end of the tube 2, this baffle 5 being of such a shape and curvature as to provide a substantially even distribution of the combustible mixture inside the hood 1.

The hood 1 is provided with flanges 6 around its lower edge portions, and these flanges 6 carry a double wire gauze diaphragm 7, the diaphragm 7 being of slightly larger size than the size across the flanges 6 and having its corners mitred, so that the edges of the diaphragm 7 can be turned back through 180° over the flanges 6, and held in position by a skirting clamping frame 8; the corners of the frame 8 are also mitred, and its edges are wrapped around the edges of the diaphragm 7 and clamped in position to closely embrace the peripheral portions of the diaphragm 7. It will be appreciated that by using suitable tool pressure, a tight lap joint can be formed sufficiently well to be gas-tight without the aid of gaskets.

To a central portion of the diaphragm 7 are attached an inner plate 9 and an outer plate 10; these plates are held firmly together, preferably by means of rivets 11, but other attaching means may be used. Though the outer plate 10 is substantially planar, the inner plate 9 has a continuous protuberance 12 extending around its peripheral edge portions, and this protuberance 12 makes contact with the diaphragm 7. The area defined by this protuberance 12 is approximately one ninth of the area of the opening in the frame 8. In a central portion, the inner plate 9 is provided with an indentation 13 in the concave inner side of which rests the end of a tensioning screw 14. The upper end of the tensioning screw 14 is screwed into a gas-tight bush 15 which is secured to the depressed portion 4 of the hood 1. The tensioning screw 14 can be screwed down to tension the diaphragm 7, and a slot 16 is provided in the top of the tensioning screw 14 to receive a screw-driver; in addition, a lock-nut 17 is provided to lock the screw 14 in adjusted position.

In a second embodiment of the invention shown in FIGURES 3 and 4, like parts have been given the reference numerals accorded to those parts in FIGURES 1 and 2. The area defined by the protuberance 12 is approximately one eleventh of the area of the opening in the frame 8. A vertical deflector 19, having side portions bent perpendicularly thereto with inclined edges, is secured to the side of hood 1 below the depression 4. This deflector 19 forms part of a combustible gas mixture spreader or diffuser which serves to provide a substantially even distribution of the combustible gas mixture inside the hood 1. The other part of the gas mixture spreader is an inclined deflector plate 20 extending from one side of the inner plate 9. Furthermore, four arms 21 of channel shaped cross section extend diagonally outwardly and upwardly from each corner of the plate 9 so that when the tensioning screw is screwed down to tension the diaphragm 7, in addition to the contact made by the protuberance 12 with the diaphragm 7, the rounded ends of the arms 21 also make contact with the diaphragm 7 at places approximately midway between the indentation 13 and the outer corners of the diaphragm 7, thus serving to assist in tensioning the diaphragm 7 without seriously impeding access of the gas mixture thereto.

Furthermore, a sealing ring 22 externally welded appropriately to the periphery of burner mixing tube 2 is secured by self-tapping screws to the side of the hood 1 and the self tapping screw 3 now serves only to locate the mixing tube in its correct position.

Though the burner is shown as being of generally rectangular shape, it will be appreciated that other shapes would be possible, and also although the inner and outer plates 9 and 10 are shown as being arranged to allow no combustible mixture to pass through them, they could be provided with apertures, which if desired could be punched out in a manner to provide means for spacing the plates 9 and 10 from the diaphragm 7, thus providing some degree of heating in this central portion of the diaphragm 7.

The burner can be appropriately supported above a grilling platform at any convenient height with a gas injector arranger to supply a jet of gas to the inlet of the mixing tube 2. At this inlet it is found advantageous to provide a flash protector 18. This flash protector 18 consists of a flange attachment adjacent the inlet of mixing tube 2 in the form of a solid disk-like plate disposed at right angles to the mixing tube axis and having its lower part depending a substantial way below the mixing tube 2. When the gas is first turned on a combustible mixture is formed outside of and below the diaphragm 7 and this mixture rapidly fills the space inside the depending wall 8' of clamping frame 8. This mixture can easily fill around the periphery of walls 8' and, being less dense than the surrounding air, rise around flange assembly 8 and be deflected toward gas injector 23. The flash caused by lighting the burner while causing the combustion zone to rapidly settle toward the outside of diaphragm 7 can also cause a flame flash toward gas injector 23 and without flash protector 18, the gas issuing from ejector 23 can be ignited causing flash-back in the burner which would necessitate repeating the lighting process. The presence of flash protector 18 deflects the spilled combustible mixture away from injector 23 and serves to impede this flash-back effect.

The clamping frame 8 can be formed of sheet metal which is adapted to stamping operations, whereas the hood 1, the mixing tube 2 and the baffle 5 could be die-castings or sand castings, for example, of iron, copper or copper alloy, or aluminium or aluminium alloy. The inner and outer plates 9 and 10 are preferably made of heat and corrosion-resisting metal, as are the rivets 11.

While two embodiments have been particularly described herein, it is understood that the invention is not restricted to these embodiments, but is only limited by the following claims.

I claim:
1. A radiating burner comprising means defining a mixing space having an outlet, a hood defining a distribution chamber for receiving combustible gas from the outlet of said mixing space and an outlet from said distribution chamber, a refractory diaphragm having inner and outer sides comprising at least two flat contacting layers of gas-porous gauze covering said distribution chamber outlet, a first plate disposed on the inner side of said diaphragm, a second plate disposed on the outer side of said diaphragm, means securing said plates together, said plates covering only the central portion of said diaphragm with the area of said second plate being at least as great as the areas of said first plate defined by the portion of said first plate in contact with said diaphragm thereby at least restricting the passage of gas through the central portion for producing a substantially uniform heating effect over a receiving area spaced from the diaphragm but extending generally parallel thereto, a combustible gas mixture diffuser, said diffuser including a deflector secured to said hood and terminating in spaced relation to said diaphragm, and an inclined plate secured to said diaphragm and overlapping said deflector in spaced relation thereto to provide for diffusion of the gas mixture entering said chamber.

2. The radiating burner as claimed in claim 1 including adjustable tensioning means for tensioning said diaphragm, said tensioning means being defined by a screw threaded member threadedly mounted in said hood, said member being arranged to abut said first plate and adjustable to urge said first plate outwardly against said diaphragm.

3. The radiating burner as claimed in claim 2 wherein said first plate includes means adapted to make contact with said diaphragm, when said diaphragm is under tension, at a location spaced from said central portion of the diaphragm.

4. The radiating burner as claimed in claim 3 in which said location is approximately midway between said first plate and the outer edge of said diaphragm.

5. The radiating burner as claimed in claim 3 in which said location is disposed on a diagonal of said diaphragm.

References Cited by the Examiner

UNITED STATES PATENTS

| 1,412,768 | 4/1922 | Barber. | |
| 1,438,092 | 12/1922 | Broch | 126—92 |
| 3,084,736 | 4/1963 | Mentel et al. | |
| 3,114,363 | 12/1963 | Koltun | 158—115 X |
| 3,185,204 | 5/1965 | Loeb et al. | 158—114 |

FOREIGN PATENTS

| 639,871 | 4/1962 | Canada. |
| 547,922 | 10/1922 | France. |
| 1,175,620 | 11/1958 | France. |
| 1,557 | 1/1914 | Great Britain. |
| 6,312 | of 1915 | Great Britain. |
| 403,527 | 12/1933 | Great Britain. |
| 826,673 | 1/1960 | Great Britain. |

FREDERICK L. MATTESON, JR., *Primary Examiner.*